Oct. 31, 1961  L. D. STATHAM  3,006,195
GAGE
Filed July 28, 1958  2 Sheets-Sheet 1

LOUIS D. STATHAM
INVENTOR.

BY

ATTORNEYS

Oct. 31, 1961 — L. D. STATHAM — 3,006,195
GAGE
Filed July 28, 1958 — 2 Sheets-Sheet 2

LOUIS D. STATHAM
INVENTOR.

ATTORNEYS

3,006,195
GAGE
Louis D. Statham, Beverly Hills, Calif., assignor to Statham Instruments, Inc., Los Angeles, Calif., a corporation of California
Filed July 28, 1958, Ser. No. 751,218
13 Claims. (Cl. 73—501)

This invention relates to a device or gage for measuring rotational velocity, and more particularly is concerned with an r.p.m. indicator.

It is a principal object of the invention to design a simple, inexpensive, yet reliable instrument for measuring rotational or angular velocity.

According to the invention, a post or spacer member, have a decreasing cross-sectional area from an upper to a lower portion thereof, is mounted in a transparent, e.g., glass or plastic, outer case. The spacer is smaller in volume than the interior of the case, and is preferably mounted in a vertical position in the central portion of the case. The spacer is preferably, although not necessarily, connected to the top and bottom of the outer case.

A first liquid is placed in the case surrounding the spacer member, and almost fills the case. The remaining minor space in the case above the first liquid is filled with a second liquid which is lighter in weight, that is of lower density, than the first liquid, and immiscible with the first liquid, or alternatively such minor space can be filled with a gas which is inert with respect to the liquid. Where a second liquid is employed, it may be chosen of a color different from that of the first liquid, so that the second liquid is easily followed and differentiated from the first liquid. The volume of the gas or second liquid is such as to form a bubble.

Any suitable liquids can be employed such as water and oils. Where a gas is employed as the second fluid, such gas may, for example, be air, although other suitable gases can be used. The second fluid, either liquid or gas, which forms the bubble in the heavier liquid which fills the major portion of the case, should be of such nature that the bubble retains its shape during operation of the instrument, and does not break up into a number of small bubbles.

When the instrument is rotated or spun on a vertical axis, the centrifugal force causes the denser first liquid beneath the bubble and adjacent the spacer to move outwardly toward the side wall of the case. This causes the bubble of second lighter liquid or air at the top of the case to seek the center of the case by centrifugal segregation, and to descend along the surface of the spacer to displace the denser first liquid forced outwardly by centrifugal force. The greater the rotational speed or revolutions per minute (r.p.m.) of the instrument, the greater the centrifugal force acting on the first heavier liquid and tending to force the heavier liquid located closer to the center of the case adjacent the surface of the spacer to move outwardly and be displaced by said bubble. Hence the greater the speed of rotation, the greater the amount of downward descent of the bubble of second liquid or air along the spacer. By calibrating the instrument and placing a scale along the spacer member, or on a transparent window of the case, the rotational speed or r.p.m. of the instrument can be observed through the transparent case by noting the position of the bubble with respect to said scale.

The invention will be more clearly understood by reference to the following description of certain preferred embodiments, taken in connection with the accompanying drawing wherein.

Figure 1:
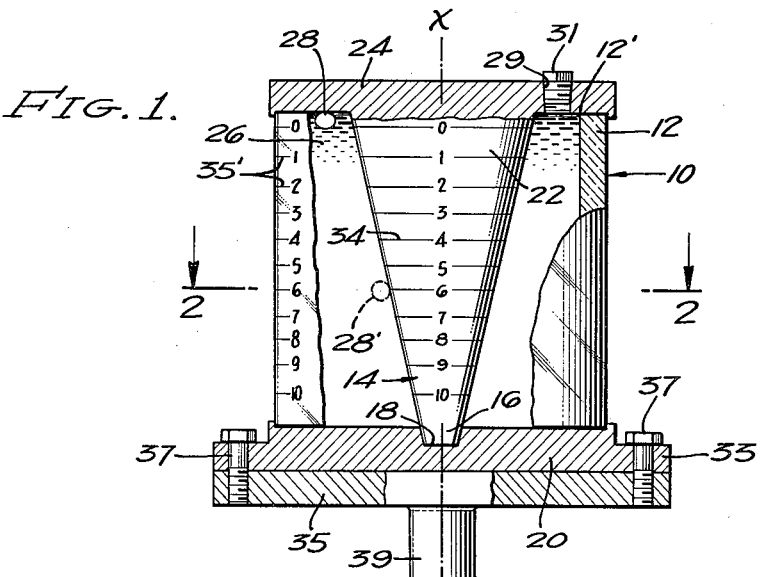
FIG. 1 is a sectional view, partly in elevation, of a preferred embodiment of the invention.
Figure 2:
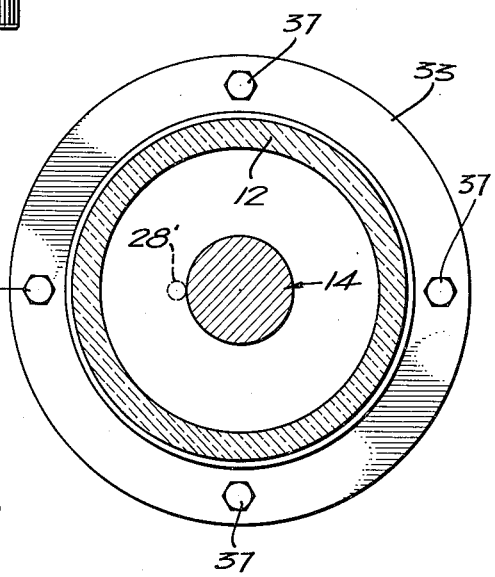
FIG. 2 is a horizontal section taken on line 2—2 of FIG. 1.

Referring to FIGS. 1 and 2, numeral 10 represents a case having transparent side walls 12, formed of glass, clear plastic, or any other suitable transparent material. The side walls 12 may be in the form of a cylinder as shown, or may have any other cross-sectional shape such as square or elliptical.

A spacer member or post 14 is mounted along vertical axis of the case. Such post is preferably of conical shape as seen in FIG. 1, having a downward taper with its apex 16 positioned in a recess 18 at the center of the bottom 20 of the case. The enlarged upper or base portion 22 of the spacer 14 may be formed integral with the top 24 of the case as shown.

The interior of the case 10 is almost completely filled with a liquid 26, e.g., water. At the top of the case above the water is a bubble of air, designated at 28. A fill hole 29 is located in the top 24 of the case, filled by a removable stopper 31.

The instrument is mounted for rotation on its vertical axis X—X by fastening the outer peripheral portion 33 of base 20 to a rotatable support 35 by means of bolts 37, said support 35 being rotatable on a central shaft 39, the rotational speed of which is to be measured. Such rotation causes the water at the inner portion of the case adjacent the surface of the spacer 14 to be forced outwardly by centrifugal force. The result is that the bubble of air 28 travels downwardly and inwardly toward the center of the case, along the tapered surface of the post 14 as indicated in dotted lines 28. The bubble of air as it descends, clings to the surface of the spacer due to the pressure of the water against the air bubble. The greater the speed of rotation or r.p.m. (revolutions per minute) of the instrument on axis X—X, the greater the displacement of the air bubble downwardly along the spacer 14. The instrument can be calibrated in r.p.m., and a scale can be marked by circumferential scribe lines 34 along the surface of the spacer 14 and also by corresponding circumferential scribe lines 35 on the window 12 of the case 10 axially of the spacer, both indicating the r.p.m. corresponding to the position of the air bubble with respect to the scribe lines at any time during rotation of the instrument, as observed through the gass walls 12 of the case.

Figure 3:
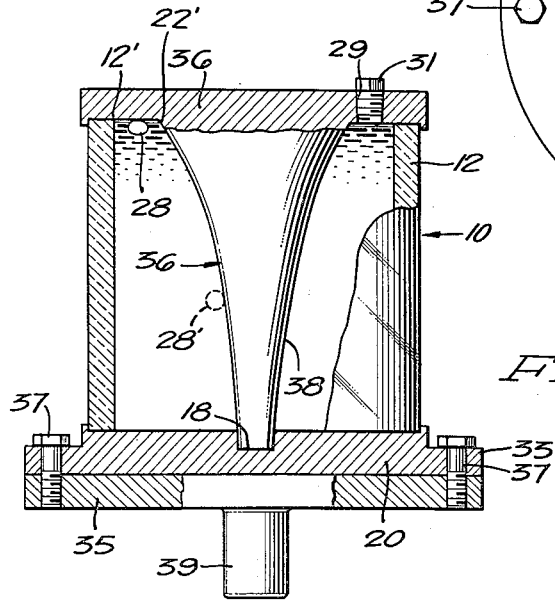
FIG. 3 is a view similar to FIG 1 of a modification.

Referring now to FIG. 3, instead of a straight tapered spacer or post 14, I can employ a post or spacer 36 having a curved downward taper 38, and I can place a scale indicating r.p.m. on the wall of the glass case and also along the spacer, as in FIG. 1. However, if desired, such scale may be placed only on the glass case, or only on the post.

In both of the embodiments shown in FIGS. 1 and 3, the distance between the adjacent upper end 12' of the side wall of the case and base 22 or 22' of the post is preferably relatively small. Thus, even though the speed of rotation is low, the bubble of air 28 will move inwardly over this short distance and take a position along the post as described above, corresponding to the speed of rotation. If the distance between the upper side wall of the case and the base of the post is relatively great, then the bubble of air, if initially adjacent the upper wall 12' of the case, must travel over a greater distance inwardly before it contacts the post, and hence a minimum rotational velocity may be required until the bubble takes a position along the upper end of the post.

The rate of downward descent of the bubble along the surface of the post is dependent not only on the rotational velocity, but also on the density of the bubble 28 of gas or second liquid, and also on the shape of the post. Thus the amount of descent of the bubble 28 along the surfaces of posts 14 and 36, respectively, for a given rate of rotation, will differ due to the different shape of the surfaces of these posts. The rate of vertical descent of the bubble along post 14 or 36 may vary linearly or non-linearly with increase in rotational speed. For purposes of illustration only, the scale formed by scribe lines 34 and 35' in FIG. 1 indicates a linear relation for this embodiment.

It is to be understood that the interior spacer or post, while preferably conical, may be in the shape of an inverted pyramid having a plurality of flat sides or any other suitable shape so long as it has a downward taper.

Further, I may use any suitable means other than that shown and described for measuring the descent of the bubble of gas or second liquid along the post, and hence the rotational speed or r.p.m. corresponding to the amount of such descent. Thus, for example, I may use photometric means for this purpose or stroboscopic examination. Where visual observation is not required for detecting the position of the bubble along the post, the outer wall of the case need not be transparent.

Also, it will be understood that the post can be mounted along the horizontal axis of the case and the instrument rotated on its horizontal axis, instead of mounting the post on the vertical axis of rotation, as shown in the drawings, since the operation of the device depends on centrifugal force.

According to a further modification of the invention, I can employ a case or container having a sloping side wall from one end to the other end of the container, a first liquid which substantially fills the container and a bubble of a second liquid in the first liquid, said second liquid being denser than the first liquid. The surface tension of the bubble should be such that it retains its shape while moving in the medium formed by the first liquid. In a preferred embodiment, the bubble of denser liquid rests on the bottom of the container, and the side walls of the container taper downwardly at an angle to the vertical, the cross section of the container accordingly decreasing from the top to the bottom of the container.

When the container is rotated on its vertical axis, centrifugal force causes the bubble of denser liquid to move further outwardly than the less dense first liquid, until the bubble contacts the bottom of the container side wall, and as the speed of rotation increases, the upward vertical component of the reacting force of the sloping side wall against the bubble causes it to move upwardly, and simultaneously outwardly, by centrifugal force, along and in contact with the side wall. The amount of upward travel of the bubble along the side wall for a given speed of rotation depends upon the relative densities of the liquid forming the bubble and of the less dense first liquid substantially filling the case, and also on the shape and angle of inclination of the container side wall. By using a transparent, e.g., glass, side wall and calibrating the device, scribe lines can be placed on the wall of the container indicating the r.p.m. corresponding to any position of the bubble of second liquid along the outer container wall.

Figure 4:
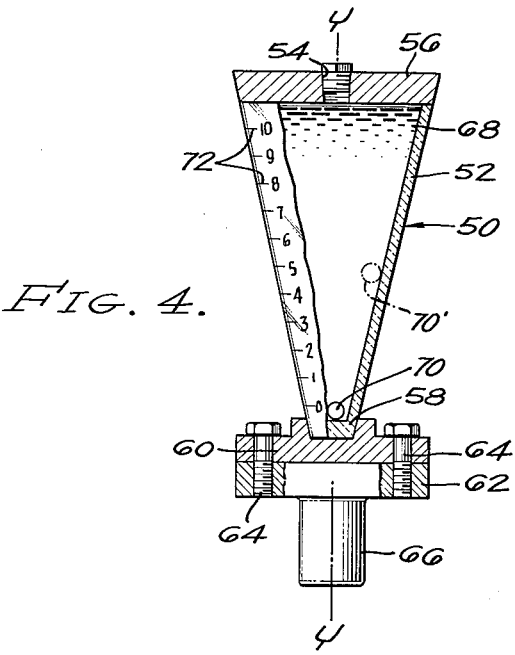
FIG. 4 is a sectional elevation of another modification of my device.

Referring to FIG. 4, illustrating the latter embodiment, 50 designates a closed container having a transparent glass or plastic side wall 52 of inverted conical shape and tapering downwardly, e.g., at about a 15° angle to the vertical. The container has a fill hole 54 in the top 56 thereof, and is supported at its narrow lower end 58 on a base 60 connected to a support 62 by screws 64, support 62 being mounted for rotation on shaft 66.

The container is filled with a first liquid 68, and at the bottom of the container in liquid 68 is a bubble of a denser immiscible second liquid 70. The first liquid may be, for example, water, and the second liquid an organic immiscible liquid, e.g., having a specific gravity of say 1.1 to 1.2. When the container is rotated on its vertical axis Y—Y, by means of shaft 66, the bubble 68 is displaced outwardly beyond the first lighter liquid medium until the bubble 70 makes contact with the wall 52. As the speed of rotation increases the bubble 70 travels upwardly along the surface of the inclined side wall as indicated at 70'. The container is calibrated with scribe lines 72 placed on the outer transparent wall of the container indicating r.p.m., whereby the position of the bubble along the scale can be read directly in r.p.m.

Figure 5:
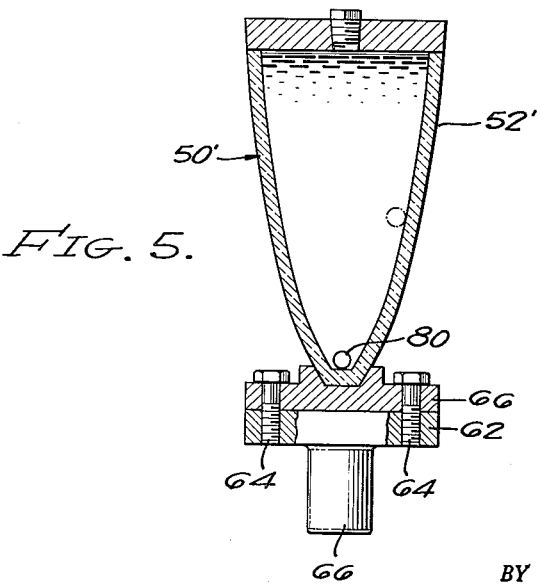
FIG. 5 is a view similar to FIG. 4 of still another modification.

In FIG. 5 is shown a modification of FIG. 4, wherein the side wall 52' of the container 50' is in the form of a curved downward taper instead of the straight downward taper of the side wall 52 shown in FIG. 4. The rate of ascent of the bubble 80 of heavier liquid along side wall 52' of the container 50', will be different from that of bubble 70 along wall 52 of container 50.

It is accordingly seen that I can employ a discrete mass which is either buoyant or non-buoyant in a liquid medium for purposes of the invention. In place of a buoyant or non-buoyant bubble of gas or liquid or described above, I can employ, for example, a small hollow ball of a material such as rubber, wood or plastic which is buoyant and operable for use in the embodiment of FIGS. 1 and 2 as a replacement for the air bubble 28, or, for example, I can utilize a metal ball having a density greater than the fluid medium as a substitute for the bubble of liquid 70 and 80 in the modifications of FIGS. 3 and 4.

From the foregoing, it is apparent that I have designed a simple, inexpensive device for readily measuring r.p.m.

While I have described particular embodiments of my invention for purposes of illustration, it should be understood that various modifications and adaptations thereof may be made within the spirit of the invention as set forth in the appended claims.

I claim:

1. A device for measuring rotational speed, which comprises a container, a post mounted in said container along a vertical axis thereof, the volume of said post being less than the volume of said container, the cross section of said post decreasing from one end to the other end thereof, a liquid filling the major portion of said container, a bubble of fluid of lower density than said liquid filling the remaining minor portion of said container adjacent the end of said post of larger cross section, said fluid being immiscible and inert with respect to said liquid, and means for locating the position of said bubble adjacent said post and measuring the rotational speed of said device on said axis corresponding to the position of said bubble along said post.

2. A device as defined in claim 1, wherein said post is mounted from one end to the other end of said container and the distance between the end wall of said container and the adjacent end of larger cross section of said post is relatively small, and wherein said last mentioned means includes a scale adjacent said post calibrated to indicate rotational speed corresponding to the position of said bubble along said post.

3. A device as defined in claim 1, wherein said liquid is water and said bubble of fluid is an air bubble.

4. A device for measuring rotational speed, which comprises an enclosed case having a transparent wall, a post mounted in said case along an axis thereof from top to bottom of said case, the cross sectional area of said post decreasing from the top to the bottom of said case, a first liquid filling the major portion of said case, a bubble of fluid of lower density than said liquid filling the remaining minor portion of said case and being immiscible and inert with respect to said liquid, and a scale mounted axially of said post and arranged to indicate rotational speed of said device on said axis corresponding to the position of said bubble of fluid along said post.

5. A device as defined in claim 4, wherein said fluid is a gas.

6. An r.p.m. tachometer, which comprises an enclosed case having a transparent side wall, a post mounted along the vertical axis of said case from top to bottom thereof, the volume of said post being less than the volume of said case, said post being tapered from the top downwardly to the bottom of said case, the distance between the upper side wall of said case and the adjacent enlarged upper end of said post being relatively small, a liquid substantially filling said case, a bubble of fluid of lower density than said liquid in said liquid at the top of said case, said fluid being immiscible and inert with respect to said liquid, and a scale mounted axially of said post adjacent thereto, calibrated to indicate rotational speed of said device on said axis corresponding to the position of said bubble of fluid along said post, whereby on rotation of said case on said axis, said bubble of fluid moves downwardly along said post adjacent said scale.

7. A tachometer as defined in claim 6, wherein said post is in the form of an inverted cone.

8. A tachometer as defined in claim 6, wherein said liquid is water and said fluid is air.

9. A tachometer as defined in claim 6, wherein said post is in the form of an inverted cone, and wherein said liquid is water and said fluid is air.

10. A device for measuring rotational speed, which comprises a container, an inclined surface within said container, said surface being disposed at an angle to the vertical axis of said container, a liquid substantially filling said container, a discrete mass in said liquid, said discrete mass being buoyant in said liquid, and being immiscible and inert with respect to said liquid, and means for locating the position of said discrete mass adjacent said inclined surface and measuring the rotational speed of said device on said axis corrseponding to the position of said discrete mass along said surface.

11. A device for measuring rotational speed, which comprises a container, a downwardly tapered surface of revolution within said container, said surface being disposed axially of the vertical axis of said container, a liquid substantially filling said container, a discrete mass in said liquid, said discrete mass being buoyant in said liquid, and being immiscible and inert with respect to said liquid, and means for locating the position of said discrete mass adjacent said tapered surface and measuring the rotational speed of said device on said axis corresponding to the position of said discrete mass along said surface.

12. A device as defined in claim 10, said discrete mass being a buoyant fluid bubble.

13. A device as defined in claim 10, said discrete mass being a buoyant solid mass.

References Cited in the file of this patent
UNITED STATES PATENTS

| | | |
|---|---|---|
| 416,896 | Braun | Dec. 10, 1889 |
| 561,052 | Holson | May 26, 1896 |
| 1,745,849 | Greibach | Feb. 4, 1930 |
| 2,165,894 | Hohndorf | July 11, 1939 |
| 2,229,681 | Sorensen | Jan. 28, 1941 |
| 2,551,717 | Anderson | May 8, 1951 |